No. 896,089. PATENTED AUG. 18, 1908.
H. DENTON.
BALL BEARING CASTER.
APPLICATION FILED SEPT. 23, 1907.

WITNESSES
Clarence E. Day

INVENTOR
Herbert Denton
By Parker & Burton Attorneys.

UNITED STATES PATENT OFFICE.

HERBERT DENTON, OF BENTON HARBOR, MICHIGAN.

BALL-BEARING CASTER.

No. 896,089.  Specification of Letters Patent.  Patented Aug. 18, 1908.

Application filed September 23, 1907. Serial No. 394,082.

*To all whom it may concern:*

Be it known that I, HERBERT DENTON, a citizen of the United States, residing at Benton Harbor, county of Berrien, State of Michigan, have invented a certain new and useful Improvement in Ball-Bearing Casters, and declare the following to be full, clear, and exact description of the same, such as will enable others skilled in the art to which it pertains to make and use the same, reference being had to the accompanying drawings, which form a part of this specification.

This invention relates to furniture casters.

It has for its object an improved caster provided with a traveling wheel capable of self-adjustment, and able to rotate both on a horizontal and a vertical axis, rotating on the horizontal axis in its travel, and on a vertical axis in adjusting itself to the direction of travel.

Figure 1:
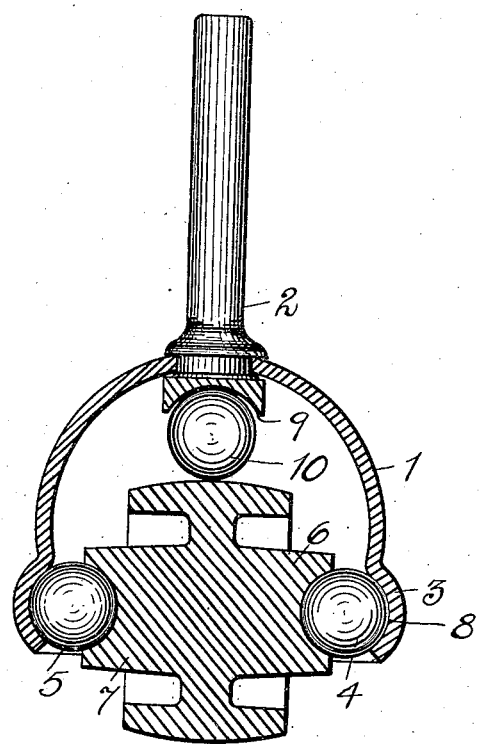
Figure 2:
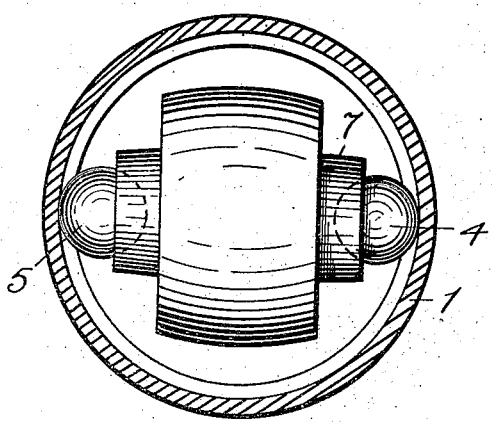

In the drawings:—Figure 1, shows a vertical section through the casing. Fig. 2, shows a horizontal section through the casing, and a projection of the traveling wheel.

2 indicates the spindle or stem by means of which the caster is secured in place to the article of furniture with which it is used. 1 indicates a casing made nearly hemispherical in form, with an extension 3 below the hemisphere, which contains a ball race in the form of a horizontal ring, concave on its inner side to receive bearing balls 4 and 5. The traveling wheel 6 is made with a large hub 7 in each end of which is a socket in which engages one of the bearing balls 4 or 5, the balls engage between the race in the hanging extension 3 and the concaved walls of the cavity in the ends of the hub 7. The wheel is thus carried on two balls on which it revolves as upon an axle, and turns on an axis perpendicular to the long axis of the hub, which it is permitted to do by the freedom of travel of the suspending balls 4 and 5 in the race 8. The lower end of the spindle 2 is provided with a cavity 9, in which engages a third ball 10 that bears against the walls of the cavity, and against the periphery of the traveling wheel 6, supporting the load on the periphery of the wheel, and not on the bearing balls 4 and 5. Each socket in which a ball is seated is concaved with an arc of larger radius than the radius of the ball seated therein, so that there is no extended surface bearing between the ball and socket.

What I claim is:—

1. A furniture caster, having in combination a traveling wheel, a case therefor provided with a horizontal race, a hub for said wheel provided with ball receiving sockets, bearing balls interposed between said race and said hub, a spindle provided with a ball receiving socket, and a bearing ball interposed between said spindle and said traveling wheel, substantially as described.

2. In a furniture caster, in combination with a casing, a traveling wheel adapted to rest upon the floor, bearing balls engaging between the casing and the ends of the axle of the wheel, and a bearing ball engaging between the periphery of the wheel and an opposed bearing in said casing, substantially as described.

In testimony whereof, I, sign this specification in the presence of two witnesses.

HERBERT DENTON.

Witnesses:
 R. O. NEELY,
 HALE TENNANT.